US006611689B1

(12) United States Patent
Cartigny et al.

(10) Patent No.: US 6,611,689 B1
(45) Date of Patent: Aug. 26, 2003

(54) SYSTEM FOR INTEGRATING MOBILE TELECOMMUNICATION TERMINALS INTO A PRIVATE TELECOMMUNICATION SYSTEM

(75) Inventors: Marc Cartigny, Montesson (FR); Alexandra Dore-Michaelis, Paris (FR); Jamal El Haysoufi, Paris (FR); Laurent Girardeau, Cergy le Haut (FR); Maurice Martin, Paris (FR); Jean-René Rousseau, Neuville S/Oise (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/276,670

(22) Filed: Mar. 26, 1999

(30) Foreign Application Priority Data

Mar. 27, 1998 (FR) ............................. 98 03848

(51) Int. Cl.[7] ................................ H04Q 7/20
(52) U.S. Cl. .............. 455/461; 455/417; 455/462; 455/463; 455/445
(58) Field of Search ................... 455/417, 432, 455/433, 552, 554, 445, 461, 462, 463

(56) References Cited

FOREIGN PATENT DOCUMENTS

| WO | WO 94/26073 | 11/1994 |
| WO | WO 97/34437 | 9/1997 |
| WO | WO 98/27761 | 6/1998 |

*Primary Examiner*—Edward F. Urban
*Assistant Examiner*—Temica M. Davis
(74) *Attorney, Agent, or Firm*—Sughrue Mion, PLLC

(57) ABSTRACT

A system for integrating mobile terminals into a private telecommunication system includes first and second servers respectively associated with a public mobile telecommunication system accessed by the mobile terminals and with the private telecommunication system. The servers enable setting up of incoming or outgoing calls relating to the mobile terminals and in accordance with a private numbering scheme specific to the private telecommunication system. They hold first and second service data relating to mobile terminal users. The first and second servers cooperate for setting up calls relating to the mobile terminals and/or managing service data.

4 Claims, 6 Drawing Sheets

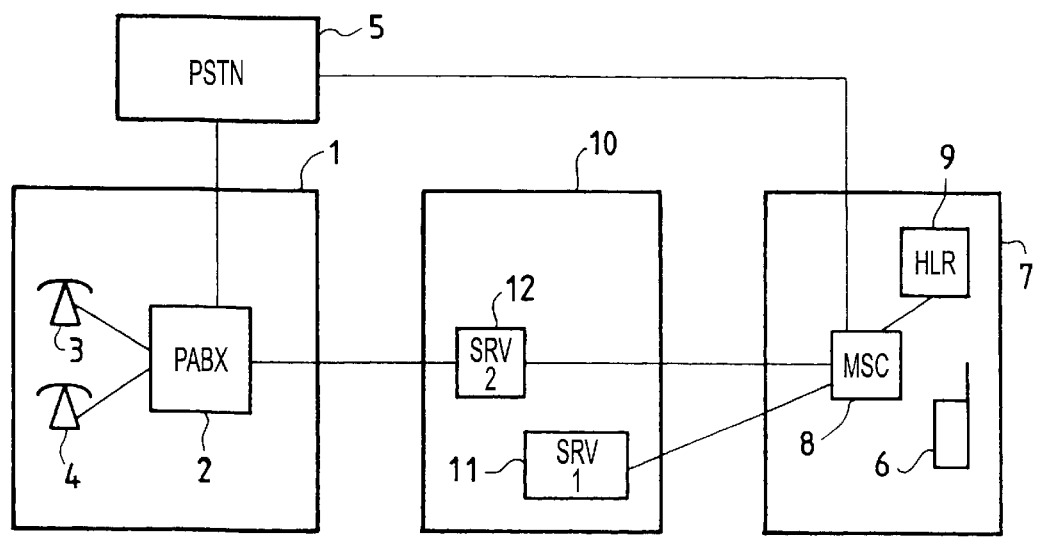
FIG_1
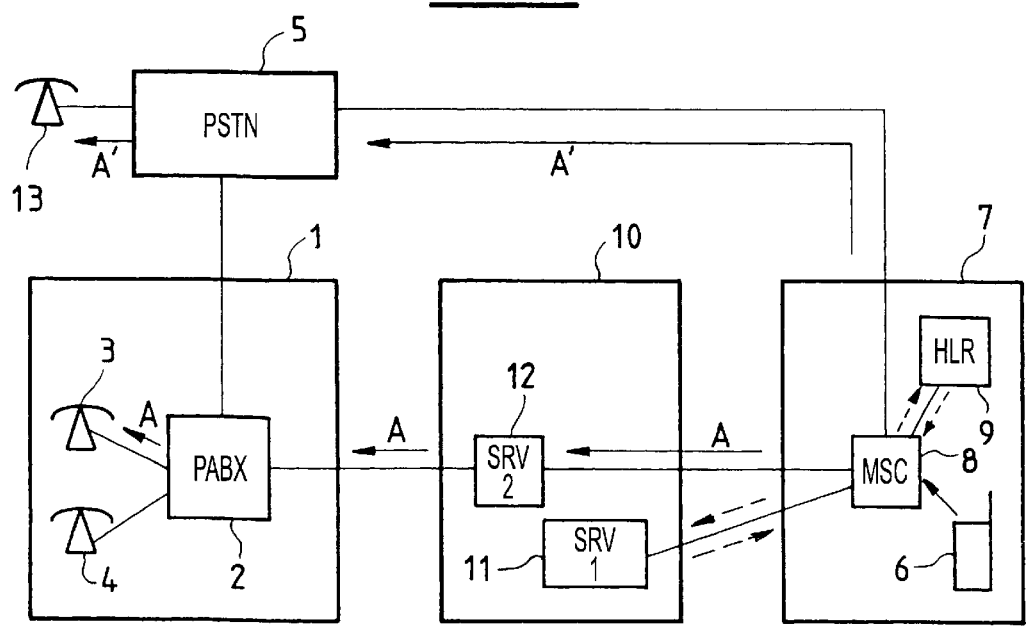
FIG_2

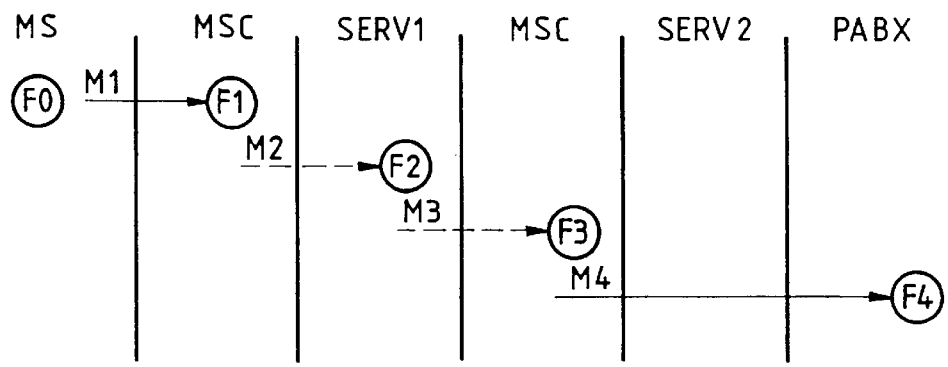
FIG_3
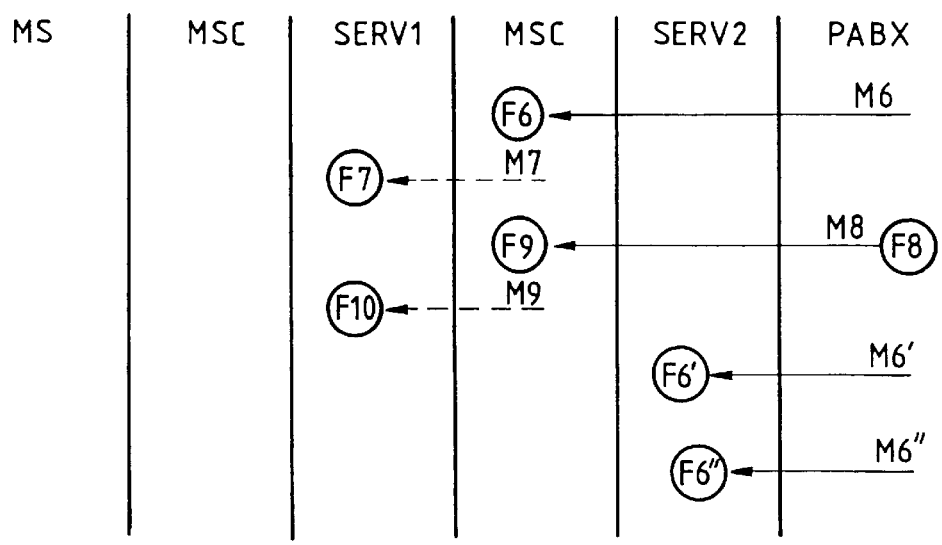
FIG_4

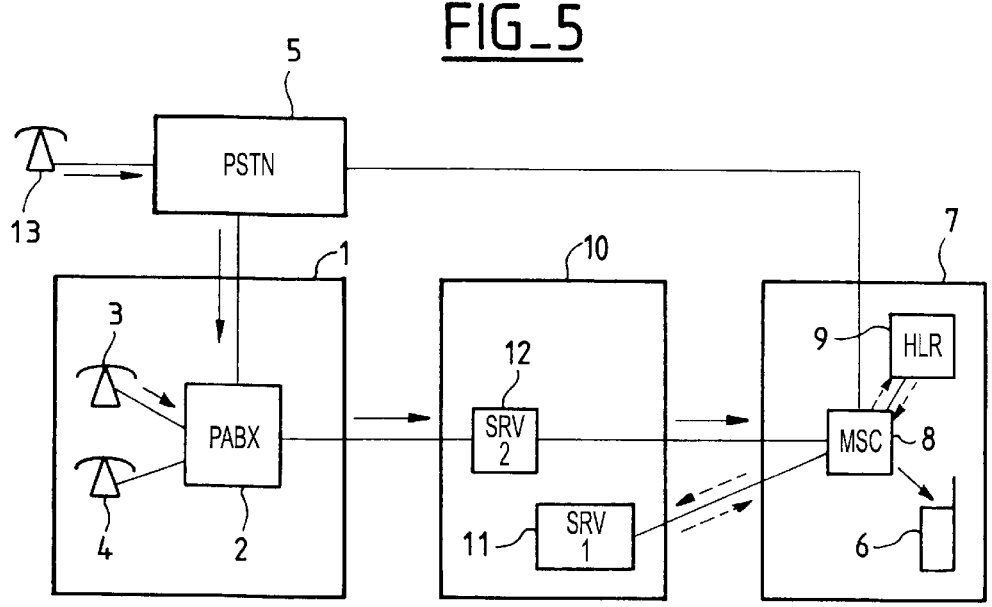
FIG_5
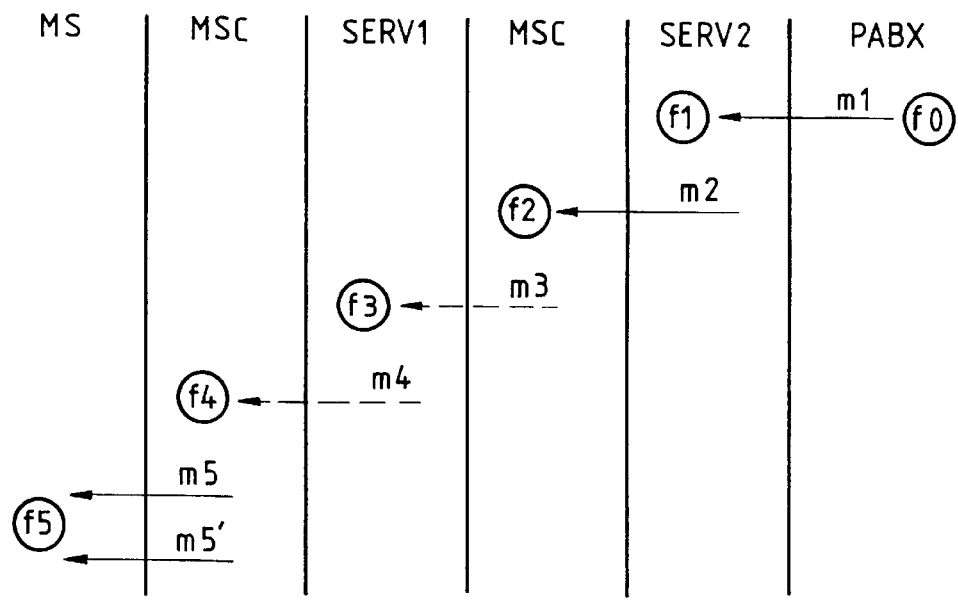
FIG_6

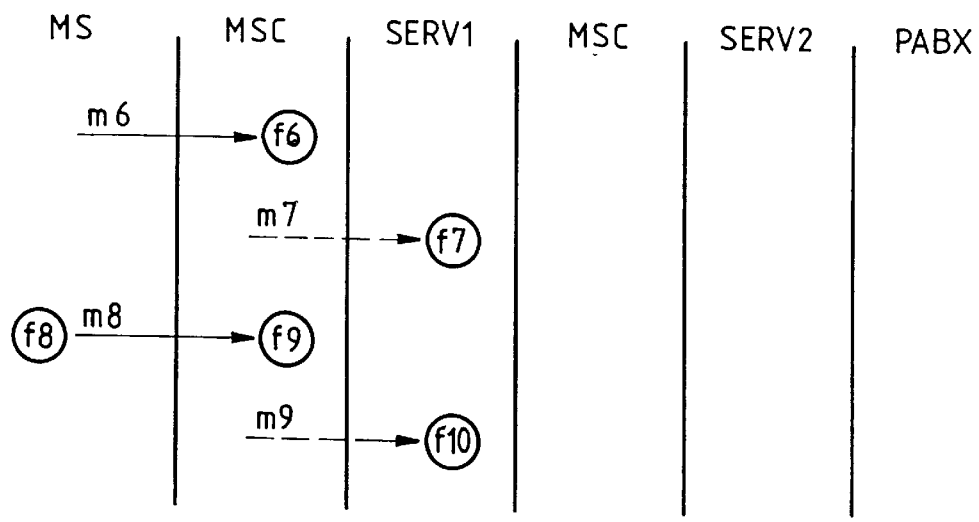
FIG_7
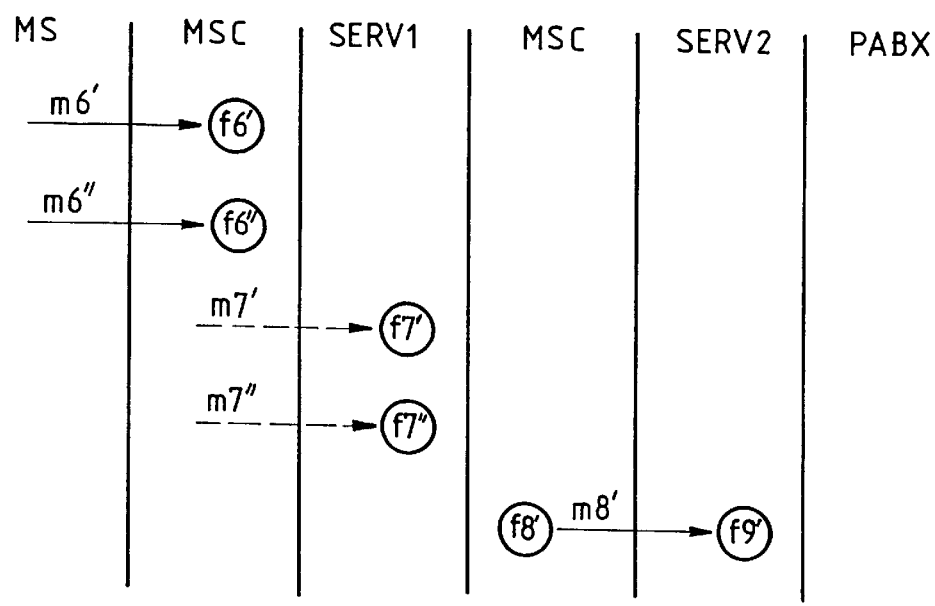
FIG_8

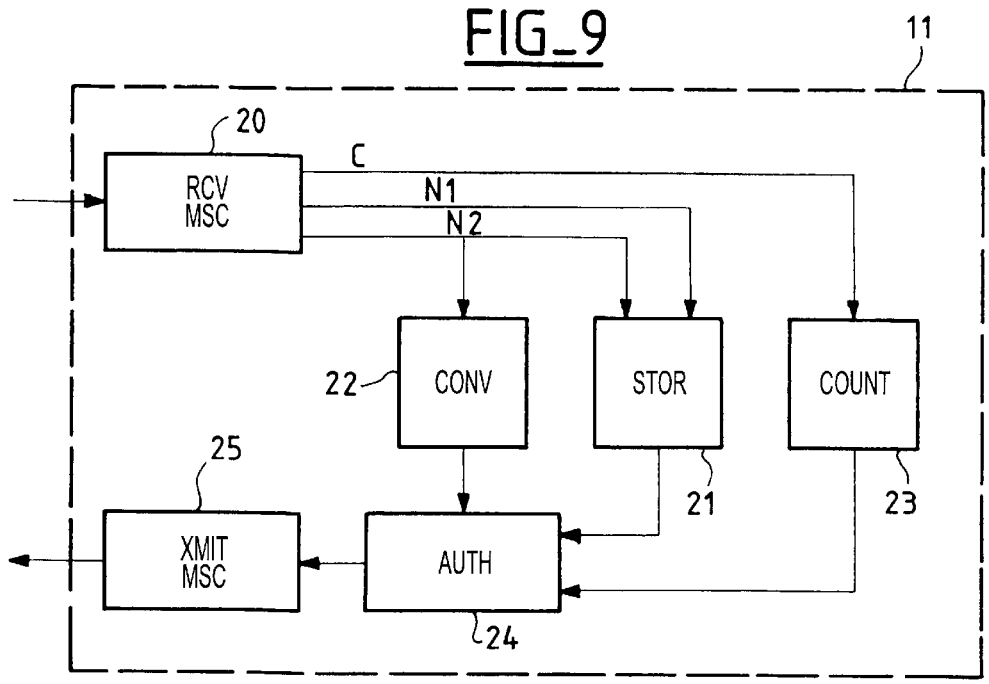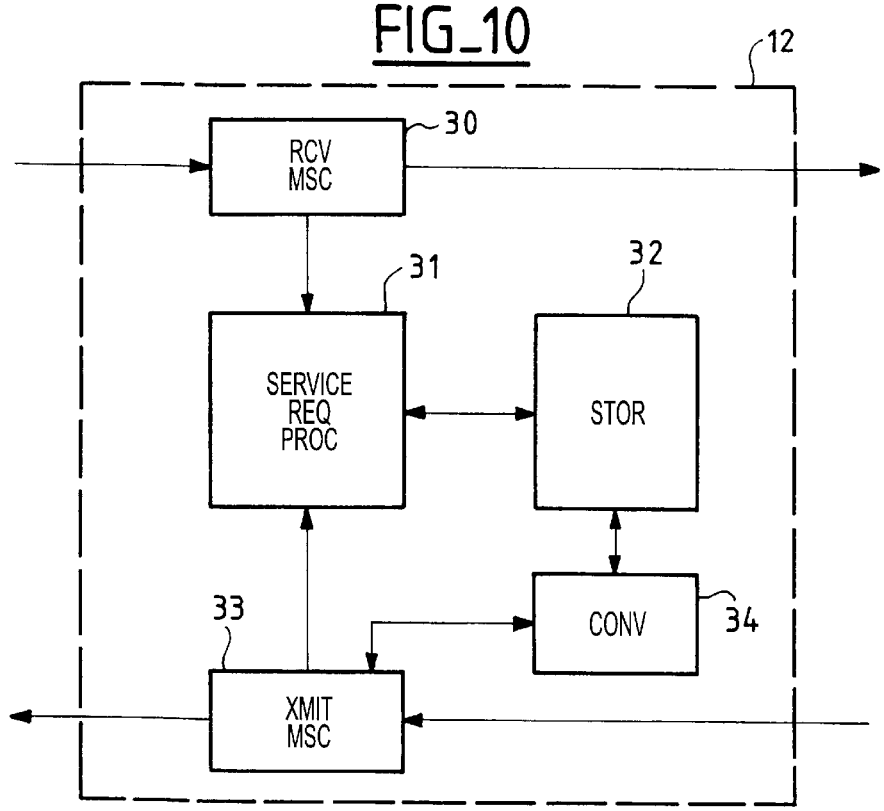

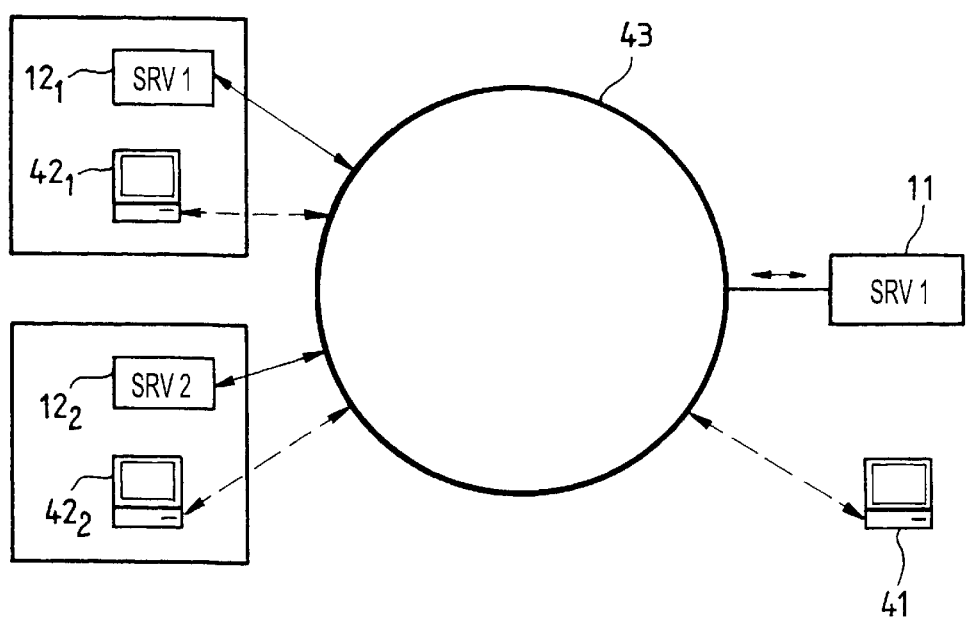
FIG_11

SYSTEM FOR INTEGRATING MOBILE TELECOMMUNICATION TERMINALS INTO A PRIVATE TELECOMMUNICATION SYSTEM

BACKGROUND OF THE INVENTION

1. Field of the Invention

The present invention is generally concerned with telecommunication systems and more particularly with a system for integrating mobile terminals, in particular cellular terminals, into a private telecommunication system.

2. Description of the Prior Art

In the present context the term "mobile terminals" means terminals designed to function in a public mobile telecommunication system, for example the Global System for Mobile communications (GSM) in the case of cellular terminals, a public mobile telecommunications system of this kind comprising a network, also known as the Public Land Mobile Network (PLMN), and mobile terminals, also known as mobile stations, able to access that network.

"Private telecommunication system" means a system formed of one or more Private Automatic Branch Exchanges (PABX) connected to a private network and terminals, generally fixed terminals, connected to the PABX.

A system for integrating mobile terminals into a private telecommunication system must be able to set up incoming or outgoing calls concerning the mobile terminals using a private numbering scheme specific to the private telecommunication system.

One solution to this problem is to modify one or other of the entities that constitute the Public Land Mobile Network (PLMN) and the PABX, to enable them to set up such calls. Clearly a solution of the above kind is not optimized in terms of flexibility, however.

Another solution, described in document WO 96/21329, avoids modifying a PABX by associating it with a server which for incoming calls converts a private number into a public mobile subscriber number. The above document merely indicates that outgoing calls are routed to a server of the above kind.

Document WO 94/26073 states that outgoing calls are routed to a server of the above kind merely upon recognition that the terminals belong to the public telecommunication system, this being indicated by the mobile subscriber database specific to the public mobile telecommunication system (the GSM's Home Location Register (HLR), for example).

A drawback of a solution of the above kind is that the PLMN must be modified to assure such routing. Also, routing outgoing calls is not optimized in the case of calls to users of the public system.

A further drawback of a solution of the above kind is that management of such mobile users by the private telecommunication system manager is not optimized. Monitoring the rights of these users is not optimized because the data relating to any incoming and/or outgoing call restrictions concerning such users cannot be centralized, but must be introduced into the mobile terminal (or into cards such as SIM cards associated with the terminals) and/or said server, and it is also difficult to monitor mobile call times for such calls as are authorized.

A solution which avoids modifying the PLMN in Virtual Private Network (VPN) systems consists in associating the PLMN with a server performing private number to public number conversion for outgoing calls, calls thereafter being routed to the private network via the public network or Public Switched Telephone Network (PSTN).

A drawback of a solution of the above kind is that routing outgoing calls is not optimized for calls to users of the private system.

Also, VPN systems necessitate modification of the PABX so that private number to public mobile subscriber number conversion is possible for outgoing calls and to enable users of such mobile terminals to access services offered by the private system.

An aim of the present invention is to avoid the various drawbacks mentioned above.

SUMMARY OF THE INVENTION

The present invention therefore consists in a system for integrating mobile terminals into a private telecommunication system, including first and second servers respectively associated with a public mobile telecommunication system accessed by the mobile terminals and with the private telecommunication system, enabling setting up of incoming or outgoing calls relating to the mobile terminals and in accordance with a private numbering scheme specific to the private telecommunication system and holding first and second service data relating to mobile terminal users, and means for cooperation between the first and second servers for setting up calls relating to the mobile terminals and/or managing service data.

In accordance with another feature of the invention, the cooperation means include means in the first server for converting a private number used for an outgoing call into a public number usable by the mobile telecommunication system and enabling the call to be routed to the second server.

In this way the PLMN does not have to be modified to route outgoing calls to the private system, in contrast to the prior art referred to above.

The public number obtained after conversion advantageously includes the private number in a sub-address field of an address itself including a public number allocated to the second server.

In accordance with another feature of the invention, the first service data include data for monitoring the rights of mobile terminal users and the mobile call times of such users.

This optimizes management of mobile users by the private telecommunication system manager in that it can be centralized and located as close as possible to the mobile call supervisory elements.

In accordance with another feature of the invention, the cooperation means include a network interconnecting the servers and enabling distribution of service data from one server to at least one other server.

Thus service data management is also optimized because it can be centralized in a way that avoids the risk of errors.

Other objects and features of the present invention will become apparent on reading the following description of one embodiment of the invention given with reference to the accompanying drawings.

BRIEF DESCRIPTION OF THE DRAWINGS

FIG. 1 is a block diagram showing one example of a system in accordance with the invention enabling mobile terminals to be integrated into a private telecommunication system.

FIG. 2 is a diagram showing the routing of an outgoing call relating to a mobile terminal within a system of the above kind.

FIGS. 3 and 4 are diagrams showing the processing of an outgoing call of the above kind.

FIG. 5 is a diagram showing the routing of an incoming call relating to a mobile terminal within a system of the above kind.

FIGS. 6 to 8 are diagrams illustrating the processing of an incoming call of the above kind.

FIGS. 9 and 10 are block diagrams showing the type of means to be provided in each of the first and second servers.

FIG. 11 is a diagram showing one example of cooperation between the first and second servers for managing service data.

DETAILED DESCRIPTION OF THE PREFERRED EMBODIMENTS

FIG. 1 shows:

a private telecommunication system 1 including (for example) one Private Automatic Branch Exchange (PABX) 2 to which fixed terminals such as terminals 3 and 4 (for example) are connected and which is connected to the public telecommunication network 5, such as the Public Switched Telephone Network (PSTN) or the Integrated Services Digital Network (ISDN), and mobile terminals like the terminal 6 (for example) adapted to function in a public mobile telecommunication system such as the system 7 whose infrastructures (or PLMN) include, in a manner that is known per se, entities called Mobile Switching Centers (MSC), such as the center 8, connected with a mobile subscriber database such as the GSM's Home Location Register (HLR).

FIG. 1 also shows a system 10 for integrating mobile terminals such as the terminal 6 (for example) into a private telecommunication system such as the system 1 (for example).

In accordance with the invention, a system of the above kind for integrating mobile terminals into a private telecommunication system essentially comprises:

first and second servers respectively associated with the public mobile telecommunication system accessed by the mobile terminals and the private telecommunication system, enabling setting up of incoming or outgoing calls relating to the mobile terminals and in accordance with a private numbering scheme specific to the private telecommunication system, and holding first and second service data relating to mobile terminal users, and means for cooperation between the first and second servers for setting up calls relating to the mobile terminals and/or managing service data.

In the example shown the first server 11 is connected to the PLMN, here to the MSC 8, and the second server 12 is connected to the PLMN, here to the MSC 8, and also to the PABX 2.

In the example described, the private telecommunication system uses a private numbering scheme in which a private number can be:

a short code number, for a call within the system, a public number preceded by an outgoing call prefix, for a call outside the system, and a code for activating a service, for example call forwarding, voice mail consultation, etc.

Hereinafter the term "incoming calls", respectively "outgoing calls", refers also to calls relating to mobile terminals and using the private numbering scheme.

What is more, in the example shown, the system 10 offers a unique number service in the case of a user allocated a fixed terminal and a mobile terminal, and if the user does not answer a call to their fixed terminal, routes the call to an automated attendant (for transfer, at the choice of the caller, to the mobile terminal associated with the fixed terminal, another number or a voice mail service), the mobile terminal, another number or a voice mail service, in a manner predefined by the called user.

The functions of the first and second servers 11 and 12 in processing incoming and/or outgoing calls will now be described by way of example with reference to FIGS. 2 to 8.

In the example shown in FIG. 2, a user of the private telecommunication system 1 enters on their mobile terminal 6 a private number comprising a short code number for calling another user of the some system (in which case the routing of the call is as shown in FIG. 2 by the arrows A) or an outgoing call prefix followed by a public number to call a user outside the private telecommunication system having a terminal 13 connected to the public system 5 (in which case the routing of the call is as shown in FIG. 2 by the arrows A'). Although not shown in the figure, the invention applies equally to the situation in which the user enters on their mobile terminal a code to activate one of the services offered by the private system.

FIGS. 3 and 4 show the processing of a call of the above kind and in them messages exchanged between the various system entities to process the call are denoted Mi and various functions executed by the various entities for processing the call are denoted Fi (i is an index representing the order of succession of the messages or functions).

FIGS. 2 and 3 also show the mobile station MS and the first and second servers, respectively SERV1 and SERV2.

The functions and messages shown in the figures are as follows:

F0: the call is initiated by the mobile station MS.

M1: a call setup message containing the caller's number (here a mobile subscriber number or MSISDN) and the called number is transmitted from mobile station MS to the MSC.

F1: on receiving message M1, the MSC recognizes that the mobile subscriber belongs to the private telecommunication system (this information is included in the HLR entity interrogated by the MSC on the basis of the caller's number) and then interrogates the first server SERV1

M2: a message containing the caller's number and the called party's number is sent by the MSC to the first server SERV1.

F2: on receiving message M2, the first server SERV1:
    determines which system is involved if there is a plurality of private telecommunication systems such as the system 1,
    verifies the rights of the caller in the system concerned against a predefined user profile, and
    converts the called party's number from a private number into a public number.

M3: a message containing the caller's number and the converted number of the called party is transmitted from the first server SERV1 to the MSC.

F3: on receiving message M3, the MSC routes the call to the correct destination (if the called party is another user of the system: to the PABX via the second server SERV2, if the called party is a user external to the system: to the public network such as the PSTN or ISDN).

M4: a corresponding alert message is transmitted from the MSC to the PABX.

F4: on receiving message M4, the PABX operates the ringer on the called terminal.

Various situations can arise:

1—the user answers:
M6: a connection message is transmitted from the PABX to the MSC, 2—the user is busy on a call:
M6': a busy message is transmitted from the PABX to the second server SERV2, 3—the user does not answer:
M6': a non-response message is transmitted from the PABX to the second server SERV2.

F6: on detecting the response by the called user, the MSC performs the following operations:
it connects the calling and called parties,
it starts charge metering.

M7: a message is transmitted from the MSC to the first server SERV1.

F7: on receipt of the message M7, the first server SERV1 activates a meter to meter the call time of the mobile user.

F8: one user terminates the call (for example the called user).

M8: a call cleardown message is transmitted from the PABX to the MSC.

F9: on receiving message M8, the MSC:
stops charge metering,
releases the resources allocated to the call.

M9: a message is transmitted from the MSC to the first server SERV1.

F10: on receiving message M9, the first server SERV1 stops metering the call time of the mobile user.

F6': on receiving message M6', the second server SERV2 routes the call to the voice mailbox of the called party. The caller can then leave a message in the called party's voice mailbox.

F6": on receiving message M6", the second server SERV2 routes the call to an automated attendant which enables the caller to choose between leaving a message in the called party's voice mailbox or calling their mobile.
if the caller chooses to call the called party on their mobile, the second server SERV2 translates the called party's number into a public mobile subscriber number and routes the call to the MSC. The call is then processed like a call from a fixed terminal to a mobile terminal, as described later in connection with FIGS. 5 to 8.
if the caller chooses to leave a message, the second server SERV2 routes the call to the called party's voice mailbox.

In the system shown in FIG. 5, a user of the public or private system enters on their terminal (13, 3 or 4) the number of a user of the private system, this number being a public number in the former case and a private number (or short code number) in the later case.

FIGS. 5 to 8 illustrate the processing of the call and in them messages exchanged between various entities of the system for processing the call are denoted mi and various functions executed by the various entities for processing that call are denoted fi (where i is an index representing the order of succession of the messages or functions).

FIGS. 5 to 8 also show the mobile station MS and the first and second servers SERV1 and SERV2, respectively.

In the example shown, the call is transferred from the fixed terminal of the called party to their mobile terminal, via the single number service already mentioned.

The various functions and messages are as follows:

f0: the PABX initiates the call.

m1: a call set-up message containing the caller's number and the called party's number is transmitted from the PABX to the second server SERV2.

f1: the call received by the second server SERV2 is routed to an automated attendant. Here the caller chooses to call the called party on their mobile. The second server SERV2 then translates the called party's number into a public mobile subscriber number.

m2: a call set-up message containing the caller's number and the called party's number is transmitted from the second server SERV2 to the MSC.

f2: on receiving message M2, the MSC interrogates the first server SERV1.

m3: a message containing the caller's number and the called party's number is transmitted from the MSC to the first server.

f3: on receiving message m3, the first server verifies the rights of the called mobile user.

m4: a message is transmitted from first server SERV1 to the MSC.

f4: the MSC commands the call to the mobile station MS.

m5: a "paging" message is transmitted from the MSC to the mobile station MS.

f5: the user's mobile terminal rings.

Various situations are possible at this point:
the user answers:
m6: a connection message is transmitted from the mobile station MS to the MSC,
the user is busy with a call:
m6': a busy message is transmitted from the mobile terminal MS to the MSC,
the user does not answer:
m6": a no answer message is transmitted from the mobile station MS to the MSC.

f6: the MSC sets up the call and begins charge metering on receiving the connection message.

m7: message transmitted from the MSC to the first server SERV1.

f7: on receiving message m7 the first server SERV1 activates means for metering the call time of the mobile user.

f8: one user (for example the user of the mobile station MS) terminates the call.

m8: a call release message is transmitted from the mobile terminal MS to the MSC.

f9: on receiving message m8, the MSC:
stop charge metering,
releases the resources allocated for the call.

m9: a message is transmitted from the MSC to the first server SERV1.

f10: on receiving message m9, the first server SERV1 stops the means for metering the mobile call time.

f6": the MSC receives the busy message and, because the call is still being supervised by the second server SERV2, sends a busy message (m8") to the second server which then routes the call to the called party's voice mailbox.

f6": the MSC receives the no answer message and sends a no answer message (m8") to the second server SERV2 which then routes the call to the voice mailbox of the called party.

m7" and M7": messages are transmitted from the MSC to the first server SERV1.

f8': the call is routed to the second server SERV2.

m8': a busy message or no answer message is transmitted from the MSC to the second server SERV2.

f9': on receiving message m8', the second server routes the call to the called party's voice mailbox.

FIGS. 9 and 10 are diagrams showing the type of resources to be provided in the first and second server, respectively, to execute the aforementioned functions.

As shown in FIG. 9, the first server 11 includes means 20 for receiving messages transmitted by the MSC and able to contain in particular a calling party number (N1) and a called party number (N2), or a command to activate or deactivate means for metering the duration of mobile calls, and for applying the number N1 and the number N2 to means 21 for storing first service data (mobile user profile), the number N2 to means 22 for converting this private number into a public number, or the command C to means 23 for metering the duration of mobile calls.

The mobile user profile data includes data relating to any incoming and/or outgoing call restrictions relating to the users (whether the restrictions apply to private or public system users).

The first server further includes means 24 for selectively authorizing, on the basis of data supplied by the means 21 for storing mobile user profile data, transmission to the MSC by the counting means 23 via the transmission means 25 of messages containing the called party's number converted by the means 22.

By way of example, cooperation between said first and second servers to set up outgoing calls is as follows. The private number to public number conversion is effected by the converter means 22 by adding to a private number, consisting of a short code number or a service code, a public number consisting of a public number allocated to the second server 12, the MSC 8 sending the resulting combination to the second server 12. In particular, if the link between the MSC 8 and the second server 12 is an ISDN link, the private number is placed in a sub-address field of an ISDN address also including the public number allocated to the second server 12.

Clearly it is not possible to give here a comprehensive list of all examples of cooperation between the first and second servers, and other examples are of course possible.

Also, in the example considered, the private number to public number conversion effected by the means 22 for outgoing calls to a user external to the private system and using a private number consisting of a public number preceded by an outgoing call prefix consists in eliminating said outgoing call prefix.

As shown in FIG. 10, the second server 12 includes means 30 for receiving information transmitted by the MSC and recognizing in that information signaling information consisting in the public number allocated to the second server and a private number accompanying that public number or a busy or no answer message in respect of the called party's mobile terminal and, in accordance with that information, routing the corresponding call either to the PABX or to the service request processing means 31 (for example an automated attendant or a voice mail service), such means cooperating with means 32 for storing second service data relating to mobile users.

The second server SERV2 also includes means 33 for receiving information transmitted by the PABX and recognizing in that information signaling information indicating call transfer to a fixed terminal connected to the PABX, a mobile terminal associated with that fixed terminal, an automated attendant or a voice mailbox, and, in accordance with that information, for routing the corresponding call either to the MSC or to the service request processing means 31 cooperating with the service data storage means 32.

The second server 12 also includes, for calls routed to a mobile terminal, means 34 for converting a private number into a public mobile subscriber number and cooperating with the service data storage means 32.

Service data relating to mobile users is therefore stored in the first and second servers and that service data common to the two servers therefore necessitates duplicated input at two different places.

FIG. 11 shows one particular example of cooperation between the first and second servers for managing service data which avoids duplicated input and is therefore more economic and avoids inconsistencies due to duplicated input errors.

In FIG. 11 the servers 11 or 12 and associated control consoles 41 or 42 are connected into a network 43. The data is entered at one equipment only, here the first server 11 (which can be common to a plurality of private telecommunication systems, such as the system 1, for example, while a second server such as the server $12_1$ or $12_2$ can be provided for each of these systems). There is one type of input screen for each type of server (first or second server) and the data for the second server input in this way is then transferred to the second server via the network 43.

More generally, the means for cooperation between the first and second servers for managing service data, include a network for distributing service data from one server to at least one other server.

There is claimed:

1. A system for integrating mobile terminals into a private telecommunication system, including first and second servers respectively associated with a public mobile telecommunication system accessed by said mobile terminals and with said private telecommunication system, enabling setting up of incoming or outgoing calls relating to said mobile terminals and in accordance with a private numbering scheme specific to said private telecommunication system and holding first and second service data relating to mobile terminal users, and means for cooperation between said first and second servers for setting up calls relating to said mobile terminals and/or managing service data, wherein said cooperation means includes a network interconnecting said servers, wherein service data information in said first service data is transferred over said network from said first server to said second server, and wherein second service data is based on said service data information from said first server.

2. The system claimed in claim 1 wherein said cooperation means include means in said first server for converting a private number used for an outgoing call into a public number usable by said mobile telecommunication system and enabling the call to be routed to said second server.

3. The system claimed in claim 2 wherein said public number obtained after conversion includes said private number in a sub-address field of an address itself including a public number allocated to said second server.

4. The system claimed in claim 1 wherein said first service data include data for monitoring the rights of mobile terminal users and the mobile call times of such users.

* * * * *